(12) United States Patent
Karichev et al.

(10) Patent No.: US 8,409,331 B2
(45) Date of Patent: Apr. 2, 2013

(54) METHOD AND DEVICE FOR PURIFYING AIR FOR FUEL CELLS

(75) Inventors: Ziya Ramizovich Karichev, Moscow (RU); Dmitry Alexandrovich Blatov, Moscow (RU); Stanislav Iliich Simanenkov, Tambov (RU); Valentina Nikolaevna Shubina, Tambov (RU)

(73) Assignee: Obschestvo S Ogranichennoi Otvetstvennostiyu "Intensis", Petersburg (RU)

( * ) Notice: Subject to any disclaimer, the term of this patent is extended or adjusted under 35 U.S.C. 154(b) by 1159 days.

(21) Appl. No.: 10/530,777

(22) PCT Filed: Nov. 4, 2003

(86) PCT No.: PCT/RU03/00469
§ 371 (c)(1),
(2), (4) Date: Oct. 17, 2005

(87) PCT Pub. No.: WO2004/042857
PCT Pub. Date: May 21, 2004

(65) Prior Publication Data
US 2006/0123989 A1    Jun. 15, 2006

(30) Foreign Application Priority Data
Nov. 5, 2002 (RU) .............................. 2002129372

(51) Int. Cl.
*B01D 53/02* (2006.01)
(52) U.S. Cl. ............... 95/139; 95/116; 95/119; 95/120; 95/121; 95/148; 502/20; 423/230; 429/19; 429/39

(58) Field of Classification Search .................. 95/139, 95/106, 116, 120, 121, 119, 148; 55/20; 423/230, 210; 429/19, 39
See application file for complete search history.

(56) References Cited

U.S. PATENT DOCUMENTS

| | | | |
|---|---|---|---|
| 3,990,912 A | | 11/1976 | Katz |
| 4,047,894 A | | 9/1977 | Kühl |
| 4,832,771 A | * | 5/1989 | Hamamatu et al. ........ 156/89.22 |
| 5,540,981 A | * | 7/1996 | Gallagher et al. ........... 428/220 |
| 5,595,949 A | * | 1/1997 | Goldstein et al. ............. 502/20 |
| 5,601,937 A | * | 2/1997 | Isenberg ........................ 429/17 |
| 6,238,544 B1 | * | 5/2001 | Oohara et al. ............... 205/536 |
| 6,273,939 B1 | * | 8/2001 | Millet et al. ................... 95/106 |
| 6,299,994 B1 | * | 10/2001 | Towler et al. ................. 429/17 |
| 2002/0005117 A1 | * | 1/2002 | Cassidy ......................... 95/96 |

FOREIGN PATENT DOCUMENTS

| | | |
|---|---|---|
| EP | 0201468 A1 | 11/1986 |
| EP | 1155729 A1 | 11/2001 |
| FR | 2290239 A | 6/1976 |
| JP | 63241877 A | 10/1988 |
| RU | 1745312 A1 | 7/1992 |

* cited by examiner

*Primary Examiner* — Michael A Marcheschi
*Assistant Examiner* — Karla Hawkins
(74) *Attorney, Agent, or Firm* — Ladas & Parry LLP

(57) ABSTRACT

The invention relates to auxiliary systems ensuring functioning of alkaline fuel cell (AFC), in particular to a method and device for sorptive purification of air used in an AFC of carbon dioxide. In accordance with the invention, in the method for purifying air for a fuel cell, the starting air is passed through an adsorber with an adsorbent of carbon dioxide, then the adsorbent is regenerated. After utilization the adsorbent comprising hydrated oxides of transition metals is regenerated at a temperature of 60-120° C. by the air spent in the fuel cell.

23 Claims, 3 Drawing Sheets

METHOD AND DEVICE FOR PURIFYING AIR FOR FUEL CELLS

FIELD OF THE INVENTION

The invention relates to auxiliary systems ensuring functioning of alkaline fuel cells (AAFC), in particular to a method and device for sorptive purification of air used in an AFC of carbon dioxide.

Atmospheric ambient air is often used as the oxidant in an AFC. There are from 200 to 400 ppm of carbon dioxide in ambient air, which, reacting with the alkaline electrolyte, form carbonates which to a significant degree impair the load characteristics of the AFC. In order to increase the lifetime of the air electrodes of the AFC, deep purification of the air of carbon dioxide is necessary.

BACKGROUND OF THE INVENTION

A method for removing carbon dioxide from the air used in an AFC is known (U.S. Pat. No. 5,595,949, class B 01 J 20/34, 21 Jan. 1997). The method comprises passing air through replaceable containers provided with granules of a porous material, which are impregnated with an alkaline solution. After utilization, the containers with spent material are removed from the device and subjected to regeneration. Regeneration is carried out by decomposing thermally the granules at temperatures of 900-1400° C., at which the carbonates are removed. After decomposing the granules are subjected to hydrolyzation to form alkalis.

A second method of regenerating the spent granules, which is patented in this patent, is the interaction of the formed alkaline metal carbonates with lime or barium hydroxide. Wherewith, insoluble calcium or barium carbonates, which are filtered off, and an alkali, which again impregnates the granules, are formed.

A drawback of the known method is the higher power consumption and labor expenditure of the process of regeneration of the sorbent for absorption of carbon dioxide. Such a method also requires an expenditure of materials, wherein the process of regeneration itself requires special measures from the point of view of safety.

This drawback is partially removed when zeolites are used as the regenerated adsorbents of carbon dioxide (U.S. Pat. No. 6,273,939, class B 01 D 53/04, 14 Aug. 2001). Zeolites purify ambient air of carbon dioxide to a sufficiently deep degree—to 1-2 ppm. The process of adsorption is carried out at a pressure of 1-100 atm., regeneration of the zeolite layer is carried out by blowing with purified air and reducing the pressure to 0.1-5 atm. Wherewith, for complete regeneration, it is necessary to increase the temperature to 50-250° C. The applicant is of the opinion that 250° C. is the most preferable temperature. Wherewith, atmospheric moisture significantly reduces the adsorptive capability of the zeolites in respect to carbon dioxide. In order to restore the sorptive capability of zeolites it is necessary to heat them up to 500-600° C. Thus, use is made of the PSA (TSA, PTSA) method, in which the gas being purified is compressed to certain pressures (from 2 to 100 atm.), at which adsorption of carbon dioxide takes place. Then the pressure is reduced, the purified gas is sent to for utilization, a portion of the purified air—the product gas—is used to clean the adsorbent layer of absorbed impurities.

Use of the PSA method requires substantial consumption of energy, special compressors and a relatively complex method of control.

Drawbacks of these are devices are partially removed in the device known from EP 1 155 729, class B 01 D 53/047, 21 Nov. 2001. The device comprises an air flow blower (a compressor or ventilator), connected by means of pipelines and a stop valve to adsorbers, provided with an adsorbent and connected to an inlet of a utilizer of purified air. The absorber, comprising a layer of activated carbon and a layer of zeolite, is loaded into the adsorbers.

Drawbacks of such a device are the high consumption of energy, complexity of the construction and control of its operation, and also the high consumption of discharged air (several times greater than the quantity of the purified air).

In respect to the combination of essential features and the achieved technical result, the prototype for the method is U.S. Pat. No. 5,595,949, the prototype for the device is EP 1155729.

SUMMARY OF THE INVENTION

The object of the invention is to develop a continuous method and on the base thereof a device for the deep purification of air of carbon dioxide without replacement of containers, blocks, cartridges and reduction of power consumption by using such adsorbents of carbon dioxide which would rapidly adsorb it and be easily regenerated with small energy consumption.

The indicated technical result is achieved by the creation of a method for purifying air for an AFC, wherein the starting air is passed through an adsorber with an adsorbent of carbon dioxide, then the adsorbent is regenerated by heating, wherein an adsorbent is arranged in the adsorber, the adsorbent comprising hydrated oxides of transition metals which are regenerated by the air spent in the fuel cell at a temperature of 60-120° C. The air fed for regeneration is heated until a relative humidity of from 15 to 85% is achieved.

The aforesaid technical result is also achieved in that in a device for purifying air for an AFC, comprising an air flow blower connected by means of pipelines and a stop valve to adsorbers provided with an absorber of carbon dioxide and connected to an air inlet of a fuel cell, wherein the stop valve is made in the form of switches that provide for the sequential connection of the inlet and outlet of one of the adsorbers to the air flow blower and to the air inlet of the fuel cell respectively, and the outlet of the other adsorber through a heater to the air outlet of the fuel cell. A product comprising hydrated oxides of transition metals, for example, hydrated zirconium oxide, is loaded into the adsorbers.

The indicated technical result may also be achieved in that the device for purifying air for fuel cells, comprising an air flow blower, connected by means of pipelines to adsorbers provided with absorbers of carbon dioxide and connected to an inlet of a fuel cell, the adsorbers, separated one from another by a partition, are mounted in one housing with the possibility of rotating about a longitudinal axis and sequentially connecting at an inlet to the flow blower and at an outlet to an outlet of the fuel cell, a product comprising hydrated oxides of transition metals is loaded into the adsorbers, and a heater is mounted at the inlet to the adsorber connected to an air outlet of the AFC. Thermal insulation may be arranged inside the adsorbers and heaters. Arrangement of the adsorbers, separated by the partition, in one housing with the possibility for their rotation about a longitudinal axis makes it possible to do away with stop valves and one of the heaters, which significantly simplifies the design of the device. During continuous or periodical rotation, the adsorbers sequentially operate for the desorption or adsorption of $CO_2$.

The use in the adsorber of an adsorbent comprising hydrated oxides of transition metals provides for deep purification of air with removal of carbon dioxide, which purification is necessary for operation of the fuel cell. Simultaneously, a reduction of the power consumption of the regeneration process is achieved. Furthermore, the process of regeneration of such an adsorbent requires the use of moist air, and just such air is present at the outlet from an AFC.

The use of air spent in the AFC for regeneration of an adsorbent comprising hydrated oxides of transition metals makes it possible to completely restore the adsorbent as a result of the fact that the spent air has higher humidity and does not contain carbon dioxide. Water vapors entering the adsorber hydrolyze the surface carbonates formed on the surface of the adsorbent during adsorption of carbon dioxide and are blown out by air that does not contain carbon dioxide.

Heating the air within the range of temperatures from 60 to 120° C. is selected for the following reasons: at a temperature less than 60° C., because of the low speed of regeneration, more lengthy heating of the adsorbent layer is necessary, and this results in a reduction of the effectiveness of purifying air of carbon dioxide. At a temperature above 120° C., and especially with a low moisture content of the air, irreversible dehydration of the adsorbent and destruction of its structure take place.

Heating the air fed for regeneration until a relative humidity of from 15 to 85% is reached ensures conduction of the process of regeneration of the adsorbent. At a relative humidity above 85%, capillary condensation of the water vapor takes place in pores of the sorbent, this resulting in a reduction of the active surface of the adsorbent. This, in turn, reduces the sorptive activity of the adsorbent and decreases the productivity of the device. At a relative humidity less than 15%, the process of regeneration of the adsorbent does not take place completely because of retardation of hydrolysis of the surface carbonates, which also results in a decrease of the productivity of the device.

Connection of the outlet of the adsorbers to the outlet of the AFC provides the possibility for regeneration of the carbon dioxide adsorbent by the air discharged from the AFC, which, working in the mode of oxidation of the hydrogen by air oxygen, does not contain carbon dioxide, and the high humidity of that air, as indicated above, significantly intensifies the process of regeneration of the adsorbent. The coefficient of use of the air simultaneously increases, which reduces the consumption of power in the process of regeneration of the adsorbent.

Loading a product comprising hydrated oxides of transition metals into the adsorbers provides for rapid absorption of carbon dioxide at room temperature and regeneration at a relatively low temperature of about 60-120° C. Wherein the steep, convex isothermal line of adsorption characterizes the capability of the adsorbent to remove carbon dioxide at low concentrations thereof. Thus, simplification of the construction and reduction of the power consumption of the process of desorbing are achieved.

The arrangement of heaters at the outlets of the adsorbers provides for the achievement of the temperature and relative humidity of the air, which are necessary for regeneration. This technical solution is more effective than the arrangement of one common heater at the outlet from the fuel cell, since the duration of operation of the adsorbers in the mode of sorption of carbon dioxide in time may differ from the duration of the process of regeneration and therefore it is more advisable to carry out the process of heating the air independently for each adsorber. The technical solution is also effective when a device containing more than two adsorbers is used. And in that case, reduction of the consumption of power is achieved as a result of the transition of the regenerated adsorbers to blowing with cold air that does not contain carbon dioxide.

Equipping the adsorbers with an adsorbent comprising hydrated zirconium oxide, as compared with other transition metals, provides the lowest expenditure of energy for regeneration and the deepest purification of the starting air of carbon dioxide. Hydrated zirconium oxide has a higher capacity in respect to carbon dioxide and a steeper absorption isothermal line as compared with the whole row of sorbents on the base of transition metals, which makes it possible to remove carbon dioxide from the air being purified at lower concentrations of the former.

Arrangement of thermal insulation inside the adsorbers and heaters reduces the inertia of the device as a result of reduction of expenditures on heating and cooling the shells of the indicated elements of the construction, and this as a result leads to a reduction of the power consumption.

The essence of the invention is explained by drawings and a description of operation of the claimed device and method.

Figure 2:
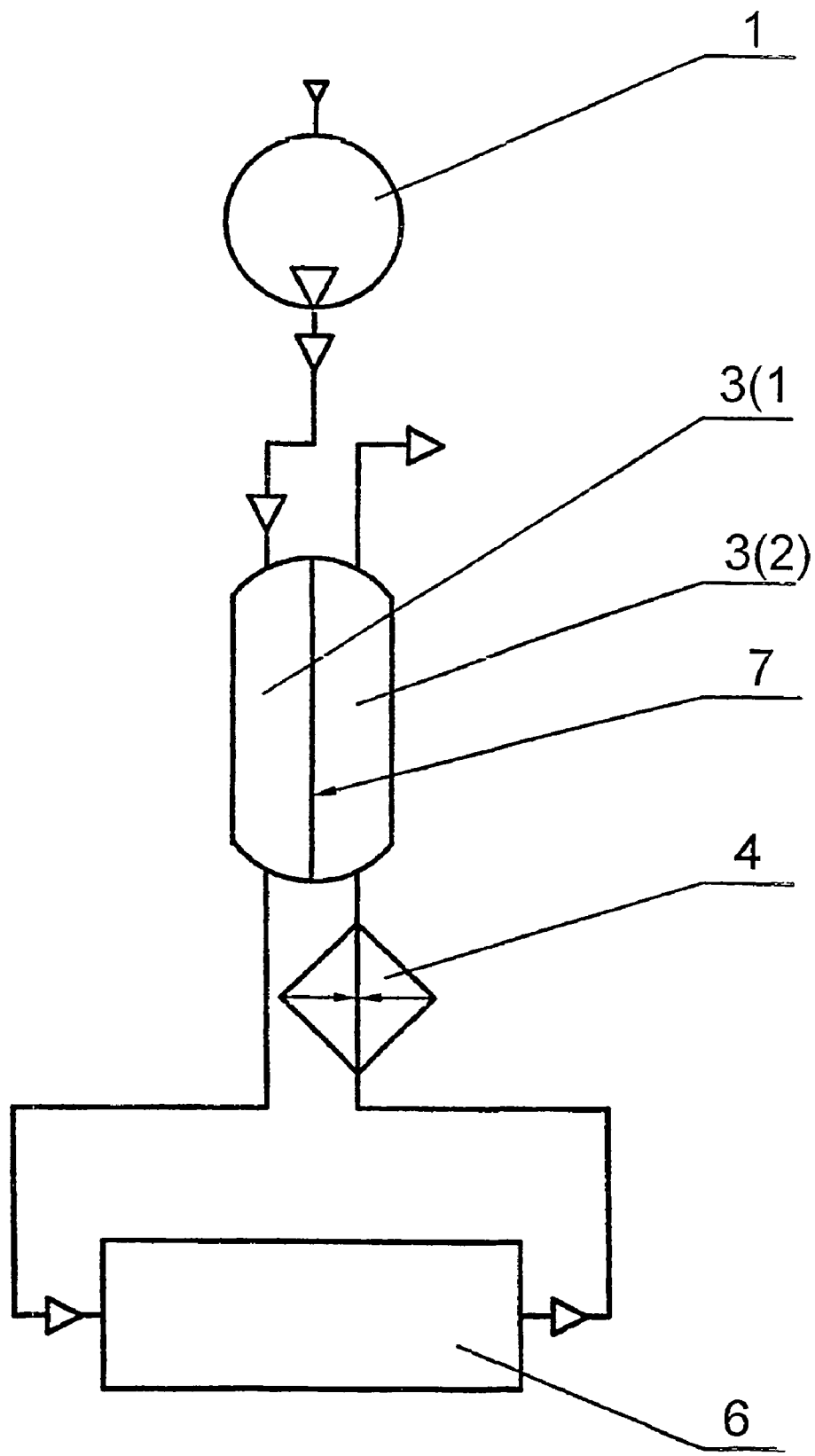
FIG. 2 shows another variant of the basic pneumatic diagram of the claimed device.

Another variant of embodiment of the device for purification of air (FIG. 2) comprises an air flow blower (compressor or ventilator) 1, connected to an inlet of one of the adsorbers 3(1) and 3(2) positioned in one housing and separated by a partition 7. A heater 4 is mounted at an inlet to one of the adsorbers (regenerated) connected to an outlet of the AFC 6.

Information Confirming the Possibility of Carrying Out the Invention

Figure 1:
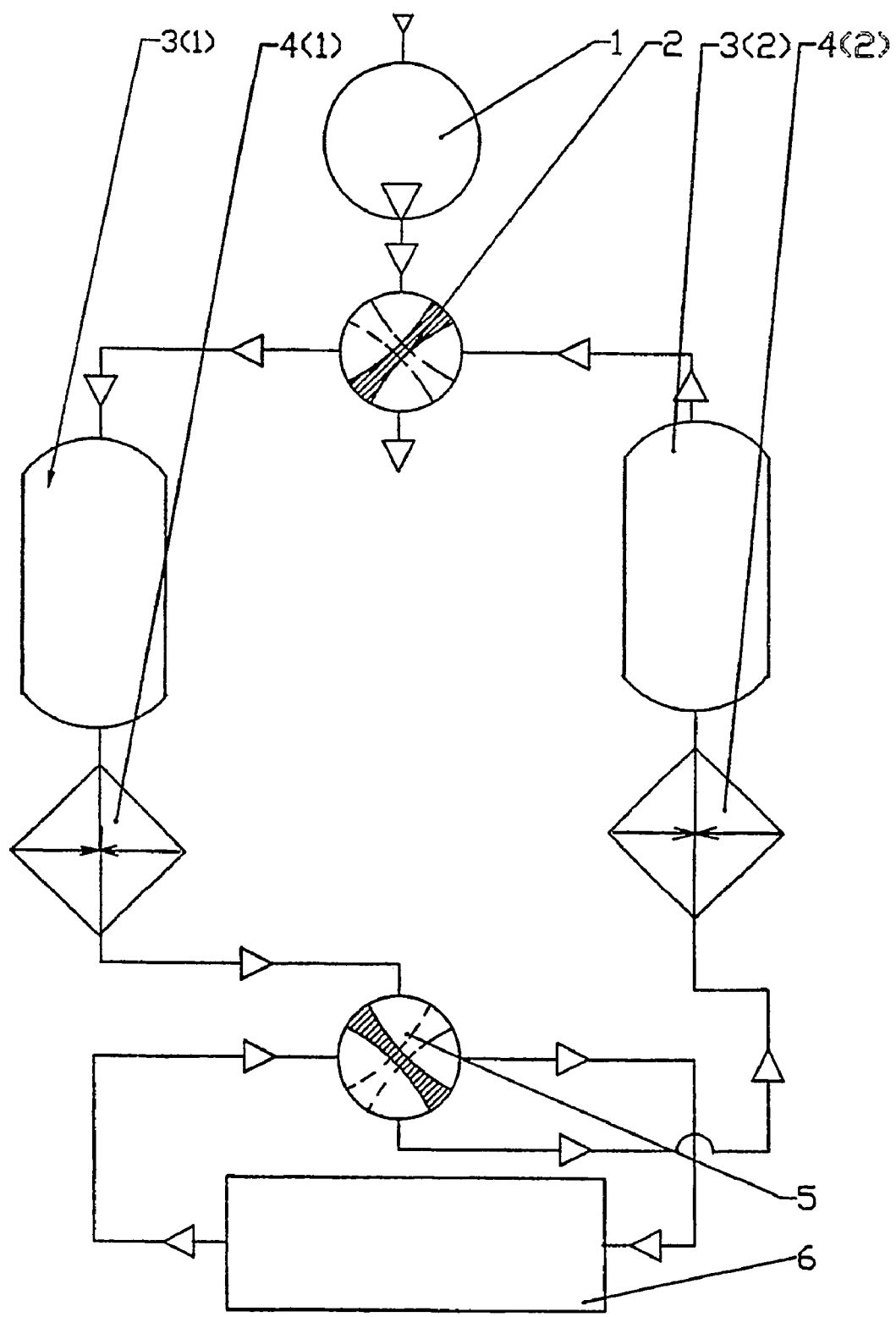
FIG. 1 shows one variant of the basic pneumatic diagram of the claimed device.

The proposed method is realized in the following manner. A sorbent on the base of hydrated oxides of transition metals in the form of granules having a size of 1.5-2 mm or in the form of blocks with ducts of different diameter is loaded into the adsorbers 3(1) and 3(2). Then heaters 4(1) and 4(2) are mounted at the inlets of the adsorbers and the adsorbers are connected through flow switches 2 and 5 to the flow blower 1 and fuel cell 6 as is shown in the diagram of FIG. 1. After that the air flow blower 1 is turned on and the starting air at room temperature (15-25° C.) is fed through the flow switch 2 to the adsorber 3(1) in which deep removal of carbon dioxide is carried out as a result of interaction of the latter with the sorbent. Air purified of carbon dioxide is fed through a turned-off heater 4(1) and a flow switch 5 to the inlet of the fuel cell 6 in which the process of generation of electric power takes place as a result of oxidation of hydrogen by oxygen of air and production of water vapors. Wherein, spent moist air with a reduced content of oxygen through the outlet of the fuel cell 6 is fed through the flow switch 5 to the heater 4(2) in which the air used in the fuel cell is heated to a temperature of 60-120° C. and fed to the outlet of the adsorber 3(2). Wherein regeneration of the adsorbent takes place with desorption of carbon dioxide. The air leaving an adsorber is discharged into the atmosphere through the switch 2, since it is not suitable for further use because of the presence of carbon dioxide and the low content of oxygen. After the process of desorbing is over, the switches 2 and 5 are set to the second position (shown by dotted line). Wherein the starting air is purified of carbon dioxide in the adsorber 3(2), while the adsorber 3(1) is set to the regeneration mode. Wherein the time of sorption is kept equal to the regeneration time. In the device executed in accordance with FIG. 2, one of the inlets of the adsorbers is constantly connected to the air flow blower 1, another inlet is constantly connected through the heater 4 to the outlet of the AFC 6. Switching the adsorbers for purification of the air or for regeneration is carried out by rotating the adsorbers about a longitudinal axis. One adsorber, connected to the blower, purifies air entering the AFC, the other, connected to the outlet of the AFC, regenerates. Then the adsorbers change places by rotation about the axis.

Example of Realization.

Figure 3:
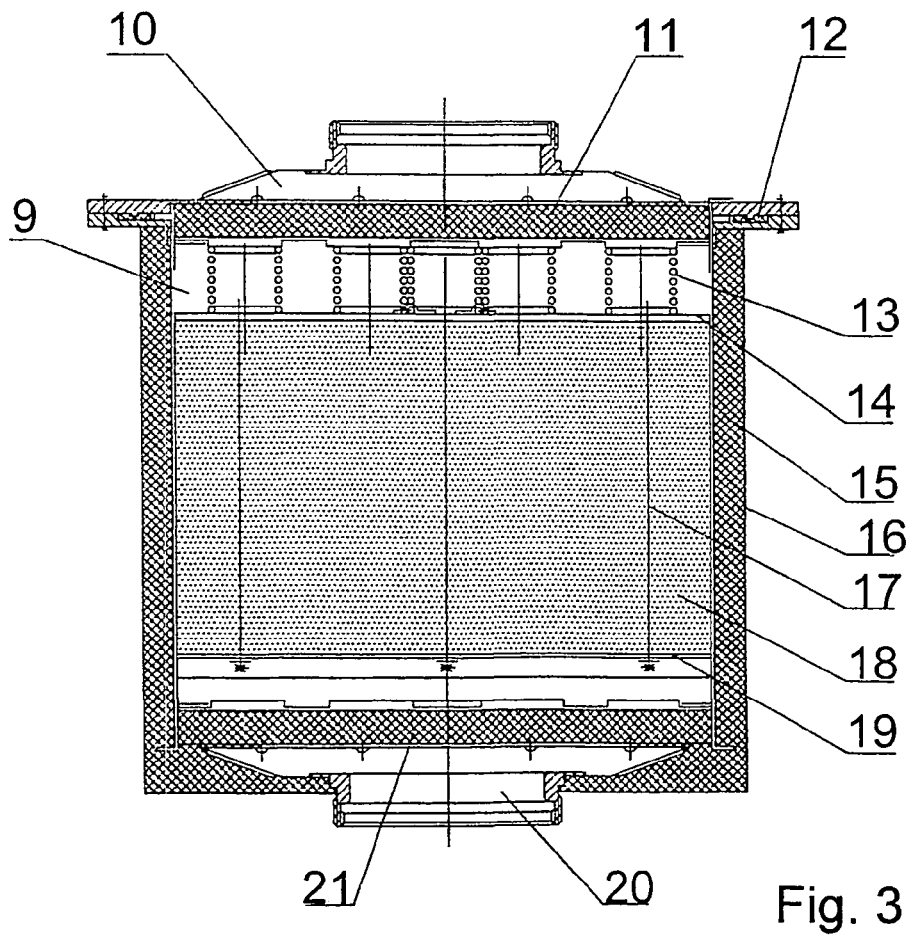
FIG. 3 shows a section view of a possible variant of embodiment of the construction of an adsorber 3.

A granulated adsorbent of the makeup: $ZrO(OH).xMgO.yH_2O$, was loaded into adsorbers having a volume of 2.0 $dm^3$ each. Ambient air at a rate of 170 l/min and content of carbon dioxide equal to 400-500 ppm was passed at a temperature of 20-25° C. and pressure of 0.1 MPa through one of the adsorbers. The duration of the sorption cycle was 15 min. Wherein the concentration of the carbon dioxide at the outlet from the adsorber was 1 ppm. At the same time the second adsorber was switched to the regeneration mode. Regeneration of the adsorber was carried out by a flow of air at a rate of 170 l/min, temperature of 80° C. and relative humidity of 40%. The duration of the regeneration cycle was 15 min, after which the second adsorber was switched to the sorption mode, the first—to the regeneration mode, which was also set by the control panel 8. The adsorber (FIG. 3) comprises a housing 9 on which an upper cover 10 is secured, in which a filter 11 is arranged. A gasket 12 is mounted between the housing 9 and the upper cover. Springs 13 are mounted inside the housing 9 under the gasket 12, the springs 13 interacting with an upper mesh 14 having a diameter less than a thermal insulation 15 applied onto the walls of the housing and made of polyurethane foam contained in a protective cover 16. Studs 17 serve to press a sorbent 18 by tightening a lower mesh 19 and the upper mesh 14. A lower cover 20 with an aerosol filter 21 is mounted in the lower part of the adsorber.

Figure 4:
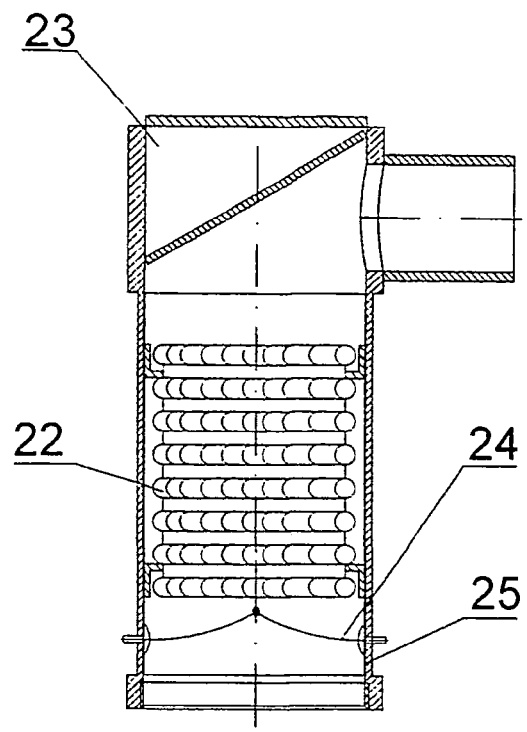
FIG. 4 shows a section view of a possible variant of embodiment of the construction of a heater. One variant of embodiment of the device for purification of air (FIG. 1) includes an air flow blower (compressor or ventilator) 1, a flow switch 2 in the form of a two-way stopcock connected to an inlet of adsorbers 3(1) and 3(2). Heaters 4(1) and 4(2) are mounted at the outlet of the adsorbers, are connected to a flow switch 5 which connects one of the adsorbers to an air inlet of an AFC 6, and another (regenerated) to an air outlet of the AFC 6.

The heater (FIG. 4) comprises a spiral 22 contained in a housing 23 in which a temperature sensor 24 and thermostable thermal insulation 25 are mounted.

The proposed device operates in the following manner.

The sorbent 18 in the form of granules of hydrated zirconium oxide is loaded into adsorbers 3(1) and 3(2), and the thermal insulation 15 and housing 16, the cover 10 with the aerosol filter 11 and gasket 12 are mounted on the housing 9. Then springs 13 are secured to the filter 11 and the upper mesh 14 is mounted with studs 17. The sorbent 18 is loaded into the cavity of the adsorber, after which the lower mesh 19 is mounted and the mesh 14 and 19 are tightened with studs 17, after which the thermal insulation 21 and the lower cover 20 are mounted.

Heaters 4(1) and 4(2) are mounted on the flange of the cover 20. The adsorbers are connected to the air flow blower and to the AFC in accordance with the diagram of FIG. 1 or FIG. 2. The technology of operation of the device is described above.

The proposed method and device provide for deep purification of air with removal of carbon dioxide and effective regeneration of the adsorbent, comprising hydrated zirconium oxide, by heated moist air, after its use in a fuel cell, which simplifies the technological process and sharply reduces power consumption.

The conclusion may be made on the basis of the foregoing that the claimed method and device may be realized in practice with achievement of the claimed technical result.

The invention claimed is:

1. A method for purifying air for fuel cells, wherein the starting air is passed through an adsorber with an adsorbent for carbon dioxide, then the adsorbent is regenerated by heating, characterized in that an adsorbent is used in the adsorber, the adsorbent comprising hydrated oxides of transition metals which are regenerated at a temperature of 60-120° C. by the air spent in a fuel cell.

2. The method for purifying air for fuel cells according to claim 1, characterized in that air fed for regeneration is heated until a relative humidity of from 15 to 85% is achieved.

3. A device for purifying air for fuel cells, comprising an air flow blower connected by means of pipelines and a stop valve to adsorbers provided with an adsorbent for carbon dioxide and connected to an air inlet of a fuel cell, characterized in that the stop valve is made in the form of switches that provide for the sequential connection of the inlet and outlet of one of the adsorbers to the air flow blower and to the air inlet of the fuel cell respectively, and the outlet of the other adsorber through a heater to the air outlet of the fuel cell.

4. A device for purifying air for fuel cells, comprising an air flow blower, connected by means of pipelines to adsorbers provided with an adsorbent for carbon dioxide and connected to an air inlet of a fuel cell, characterized in that the adsorbers, separated one from another by partitions, are positioned in one housing with the possibility of rotating about a longitudinal axis and sequentially connecting at an inlet to the air flow blower and at an outlet through a heater to an air outlet of the fuel cell.

5. The device for purifying air for fuel cells according to claim 3, characterized in that the adsorbers are provided with an adsorbent containing hydrated oxides of zirconium.

6. The device for purifying air for fuel cells according to claim 3, characterized in that thermal insulation is arranged inside the adsorbers and heaters.

7. The device for purifying air for fuel cells according to claim 4, characterized in that the adsorbers are provided with an adsorbent containing hydrated oxides of zirconium.

8. The device for purifying air for fuel cells according to claim 4, characterized in that thermal insulation is arranged inside the adsorbers and heaters.

9. A method for purifying air for a fuel cell comprising the steps of:
   (a) passing air through adsorbents that absorb carbon dioxide to purify the air of carbon dioxide, said adsorbents comprising a hydrated oxide of a transition metal;
   (b) passing the air from step (a) to the fuel cell for functioning of the fuel cell;
   (c) heating air spent in the fuel cell to a temperature of 60-120° C.; and
   (d) regenerating the adsorbents with the heated air.

10. The method according to claim 9, wherein the heated air for regenerating the adsorbent has a relative humidity of from 15 to 85%.

11. The method according to claim 9, wherein the adsorbents are contained in at least first and second adsorbers and the method comprises a first cycle in which air is passed in step (a) through the adsorbents in the first adsorber with the air heated in step (c) being used to regenerate the adsorbents in the second adsorber, and a second cycle in which air is passed in step (a) through the adsorbents in the second adsorber with the air heated in step (c) being used to regenerate the adsorbents in the first adsorber.

12. A device for purifying air for a fuel cell, comprising:
(a) a blower for creating a flow of air;
(b) a plurality of adsorbers, including at least first and second adsorbers each of which comprises an inlet and an outlet, each of said first and second adsorbers comprising an adsorbent for carbon dioxide;
(c) a fuel cell comprising an inlet and an outlet;
(d) at least a first heater;
(e) a plurality of pipelines connecting components (a), (b), (c) and (d) such that (i) air flowing from the blower can pass through the adsorbents in at least the first adsorber to purify the air of carbon dioxide, (ii) the purified air can pass through the fuel cell for functioning thereof, (iii) air spent in the fuel cell can pass through the heater for heating the air and (iv) the heated air can pass through the adsorbents in at least the second adsorber to regenerate them, wherein the adsorbents comprise a hydrated oxide of a transition metal which are regenerated at a temperature of 60-120° C.

13. The device according to claim 12, wherein the pipelines comprise switch means for selectively allowing air flowing from the blower to pass sequentially either (a) through the first adsorber, the fuel cell, the at least first heater and then through the second adsorber, or (b) through the second adsorber, the fuel cell, the at least first heater and then through the first adsorber, whereby the adsorbents in the first adsorber can be used to purify air of carbon dioxide while the adsorbents in the second adsorber are being regenerated or vice versa.

14. The device according to claim 13, comprising a plurality of heaters, the pipelines connecting the components such that spent air passing from the fuel cell to the second adsorber passes through the first heater while spent air passing from the fuel cell to the first adsorber passes through a second heater.

15. The device according to claim 12, wherein the first and second adsorbers are contained in a single housing and are separated from one another by a partition, said first and second adsorbers being rotatable around a longitudinal axis such that, upon rotation of the adsorbers, the blower can be connected to the inlet of the second adsorber and the at least first heater can be connected to the outlet of the first adsorber.

16. The device according to claim 12, wherein the adsorbents comprise a hydrate oxide of zirconium.

17. The device according to claim 13, wherein the adsorbents comprise a hydrate oxide of zirconium.

18. The device according to claim 14, wherein the adsorbents comprise a hydrate oxide of zirconium.

19. The device according to claim 15, wherein the adsorbents comprise a hydrate oxide of zirconium.

20. The device according to claim 12, wherein the adsorbers and the at least first heater comprise thermal insulation.

21. The device according to claim 13, wherein the adsorbers and the at least first heater comprise thermal insulation.

22. The method according to claim 1, wherein the adsorber comprises a container the contains the absorbent and the hydrated oxides of the transition metals are regenerated without replacement of the container.

23. The method according to claim 9, wherein the absorbents comprise hydrated oxides of transition metals that are contained in at least a first container and the hydrated oxides of the transition metals are regenerated without replacement of the container.

* * * * *